United States Patent
Cassano et al.

(10) Patent No.: US 6,683,623 B1
(45) Date of Patent: Jan. 27, 2004

(54) SYSTEM AND METHOD FOR PROVIDING AND ACCESSING EDUCATIONAL INFORMATION OVER A COMPUTER NETWORK

(75) Inventors: James S. Cassano, Devon, PA (US); Douglas J Heller, Flourtown, PA (US); Jonathan Schmalzbach, Philadelphia, PA (US)

(73) Assignee: New Forum Publishers, Conshohocken, PA (US)

( * ) Notice: Subject to any disclaimer, the term of this patent is extended or adjusted under 35 U.S.C. 154(b) by 371 days.

(21) Appl. No.: 09/650,610

(22) Filed: Aug. 30, 2000

(51) Int. Cl.[7] .................................................. G09G 5/00
(52) U.S. Cl. ..................... 345/705; 345/707; 345/714; 345/751; 345/854
(58) Field of Search ................................. 345/705, 708, 345/707, 712, 713, 714, 745, 747, 854, 751, 742; 434/350, 323, 365, 309, 317; 707/501.1; 715/513; 709/217, 219

(56) References Cited

U.S. PATENT DOCUMENTS

| 5,968,125 | A | * | 10/1999 | Garrick et al. ............. 709/224 |
| 6,009,429 | A | * | 12/1999 | Greer et al. ................... 707/10 |
| 6,085,229 | A | * | 7/2000 | Newman et al. ............ 709/203 |
| 6,347,943 | B1 | * | 2/2002 | Fields et al. ................ 434/118 |
| 6,370,355 | B1 | * | 4/2002 | Ceretta et al. .............. 434/350 |
| 6,389,458 | B2 | * | 5/2002 | Shuster ........................ 709/213 |
| 6,446,076 | B1 | * | 9/2002 | Burkey et al. .............. 707/102 |
| 6,498,920 | B1 | * | 12/2002 | Simon ......................... 434/350 |

* cited by examiner

Primary Examiner—John Cabeca
Assistant Examiner—Cuong T. Thai
(74) Attorney, Agent, or Firm—Schnader Harrison Segal & Lewis LLP (57) ABSTRACT

A web site provides educational information over a computer network such as the Internet. The web site includes a plurality of web pages that can be displayed by the user. The web pages have a particular construction and content to facilitate review by the user. A first web page can be displayed that includes a combination of original information on a given educational topic, a hypertext link corresponding to the educational topic linked to a third party site and customized information corresponding to the third party site. The original information can be comprised of text and/or graphical images. The customized information comprises text in a form designed to encourage curiosity and visitation of a third party site for more information on the given educational topic.

14 Claims, 7 Drawing Sheets

SYSTEM AND METHOD FOR PROVIDING AND ACCESSING EDUCATIONAL INFORMATION OVER A COMPUTER NETWORK

BACKGROUND OF THE INVENTION

1. Field of the Invention

The present invention relates to a system and method for providing and accessing educational information over a computer network and to a graphical user interface for display of educational information in a format to facilitate learning and a users navigation of a particular web site.

2. Background of the Invention

Educational material has traditionally been available primarily in the form of books or other similar written material. For years this has been the primary teaching method in schools, colleges and universities. Some downsides are that books are cumbersome to carry and also are rather expensive, especially considering the frequency in which books need to be updated.

Networks, such as the Internet and World Wide Web (the "Internet") has provided a mechanism by which computers are able to share information, including educational material. Computers which share information over the Internet typically operate according to a client/server protocol. Servers operate to provide information, such as web pages, which are available over the Internet and can be retrieved by other computers operating as clients. Typically, when a web page is retrieved, a request is made by the client over the Internet to a particular server which maintains the information. The server, in turn, transfers the requested web page to the client computer, where it can be displayed. The client computer will typically utilize a network "browser" program, such as MICROSOFT® Internet Explorer, to identify the particular web page and to display the web page after it has been received.

Some of the problems associated with accessing educational information over the Internet are that it is difficult to target particular subjects of information, information that is obtainable is often times difficult to understand by some individuals, especially children, resulting with a loss of interest, the material is provided in formats that are complicated to follow and it is often difficult to obtain more than a limited amount of information relating to a particular topic.

The present invention has been developed in view of the foregoing and to overcome the deficiencies of the prior art.

SUMMARY OF THE INVENTION

The present invention discloses a system and method for providing and accessing educational information over a computer network, such as the Internet. In addition, the present invention provides a graphical user interface for use on a computer in general and in particular to a computer connected to a network such as the Internet.

DETAILED DESCRIPTION OF THE PREFERRED EMBODIMENTS

Figure 1:
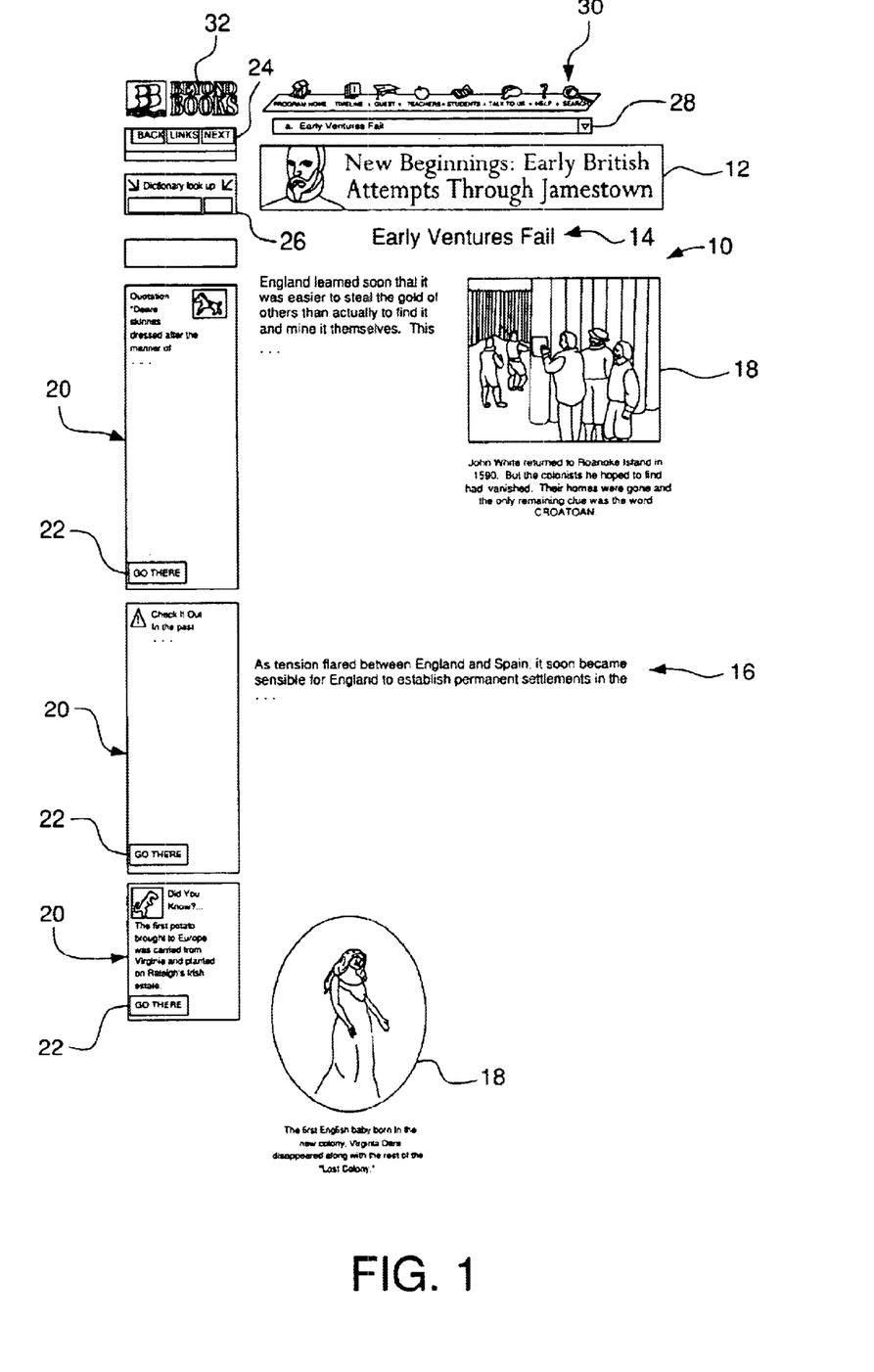
FIG. 1 is a graphical user interface in accordance with one embodiment of the present invention.

Referring now to the drawings in detail, wherein like reference numerals described herein correspond to like elements throughout the several views, there is illustrated in FIG. 1 an embodiment of a graphical user interface comprising a web page 10. In this embodiment, applicant has termed the web page 10 as a "focus page". The focus page 10 in this embodiment includes a title area 12, which is illustrated in this embodiment comprising a rectangular box, although other configurations may also be provided, and preferably original text and/or a graphical image contained within the box 12. Preferably the title area 12 in this embodiment is positioned closer to the top of the web page 10 than the bottom and more preferably the title area 12 is also positioned closer to the right side of the web page 10 than the left side.

In addition, in this embodiment, preferably positioned directly underneath the title area 12 is an area of information 16, preferably original text, relating to the subject of the title described in the title area 12. For example, in this embodiment, the title area 12 reads "New Beginnings: Early British Attempts Through Jamestown" and the information area 16 is a detailed description relating to that particular topic. In the present embodiment, the information area 16 is separated from title area 12 by a sub-title area 14, which the applicant calls a focus topic, and which is positioned underneath and centered below the title area 12. In this embodiment, the sub-title area 12 reads "Early Ventures Fail" and information area 16 preferably comprises original text, and optionally one or more graphical images. In this embodiment, two graphical images 18 are provided within the area 16. In addition, preferably the graphical images 18 also serve as a hyperlink to a third party site when activated by the user. In this embodiment, the graphical images preferably are obtained from the third party site, such as by copying or by downloading of the image data. In addition, text is provided underneath each graphical image 18, which preferably is original text and more preferably the text is customized in a form to "tease" the user by encouraging curiosity or otherwise make the user want to learn more information and visit the third party site, which can be accomplished in the present embodiment by clicking on the icon.

In addition, in the present embodiment, preferably one or more areas 20 are provided closer to the left side than the right side of the web page 10 and more preferably the areas 20 are located adjacent to the area 16. In the present embodiment, three areas 20 are provided. Each of the areas 20 can be comprised of any combination of text or graphical images. In this embodiment, each of the areas 20 are comprised of both text and graphical images and are provided within a boxed outline. The shape of the box can vary depending on the desired shape of the box and amount of material contained within the box of each area 20. In addition, preferably contained within each of the areas 20 is a hyperlink to a third party site. In the present embodiment, each of the hyperlinks are represented by a rectangular box 22 including the text "GO THERE", although other configurations can also be utilized where desired. Further, preferably in this embodiment the text is original text and more preferably the text is also customized in a form to tease the user similar to the text associated with images 18, so that the user will want to find out more information about a given topic via the hyperlink.

In the present embodiment, one or more navigation areas 24 can also be provided; in this embodiment, there are two navigation areas 24, with the first provided on the left side of web page 10 above the areas 20 and adjacent the title area 12, and with the second provided toward the bottom of the page 10 underneath the area 16. In the present embodiment, each of the navigation areas 24 include one or more navigation links to other areas within the site. In the present embodiment, there are three such navigation icons comprising a "back" icon, a "links" icon and a "next" icon. The "back" icon will take the user to a previous web page, the "next" icon will take the user forward to the next successive web page and the "links" navigation icon will take the user to a web page by which the user can obtain further information about a given subject, which will be described in more detail below.

In this embodiment, the web page 10 can also include where desired a dictionary block 26, a drop down box 28 and a site navigation area 30. The dictionary block 26 in this embodiment is generally rectangular and comprises a hyperlink to a third party site by which the definition of a given word typed into the box can be accessed. The drop down box 28 in this embodiment is generally rectangular and preferably includes a written outline of related subjects. The site navigation area 30 is preferably generally rectangular in shape and includes one or more icons which operate as links to other web pages on the site. Preferably, the dictionary block 26 is positioned between the navigation area 24 and areas 20 on the left side of the web page 10, and the drop down box 28 and site navigation area 30 are both provided above the title area 12. As should be understood the dictionary block 26, the drop down box 28 and navigation area 30 can be provided having other configurations and at other locations on web page 10 where desired. Finally, the web page 10 can include a logo block 32 which is generally rectangular in this embodiment located on the upper left corner.

Figure 2:
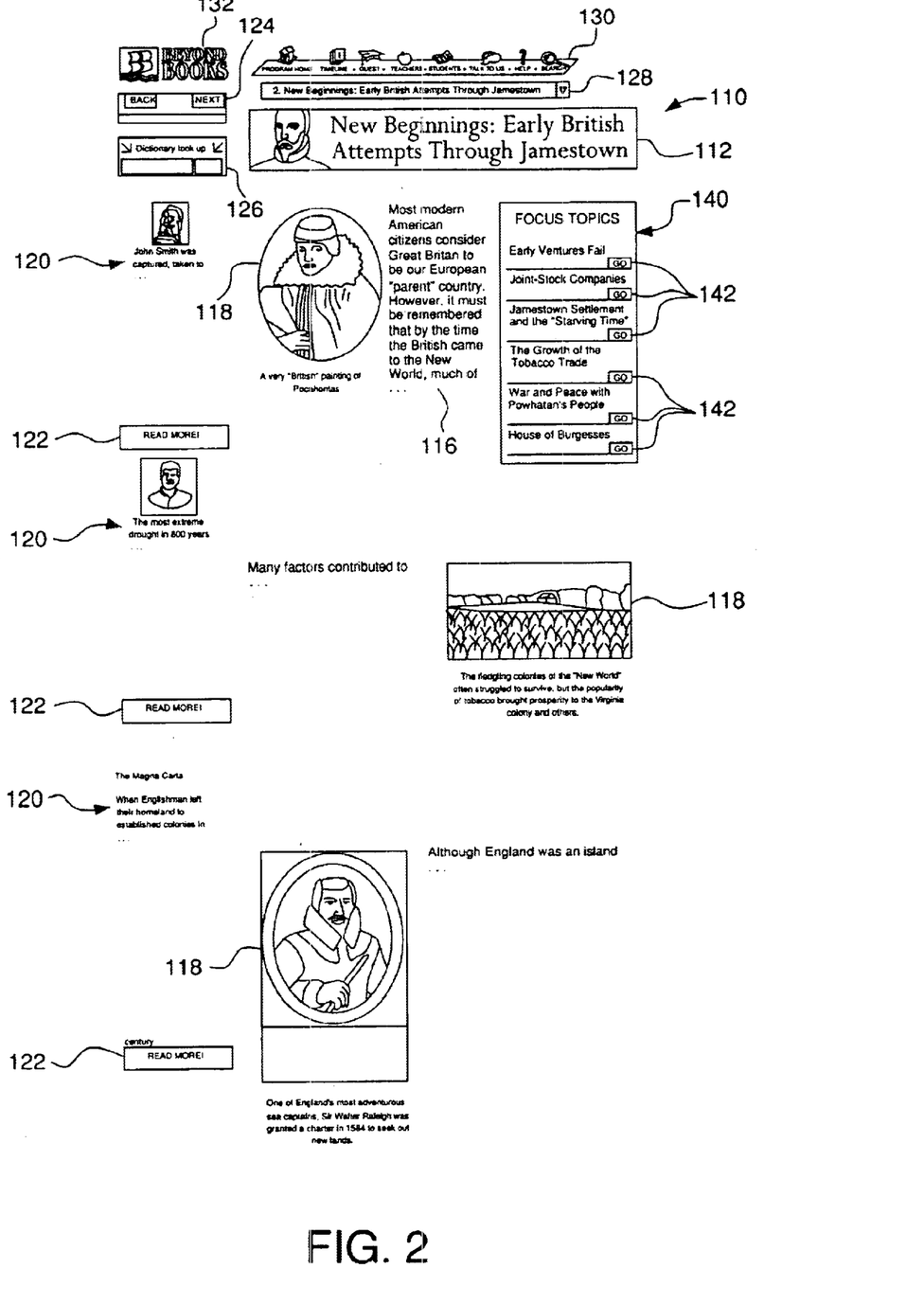
FIG. 2 is a graphical user interface in accordance with a second embodiment of the present invention.

In FIG. 2 is illustrated another embodiment of a graphical user interface in accordance with the present invention comprising a web page 110, which applicant has termed "locus page". For the sake of simplicity, the portions in the web page 110 which are similar to portions on web page 10 will be described using the same numbering designations except beginning with 100 and will not be described in detail. Rather, the following description will focus on the features in the web page 110 which differ from that disclosed in connection with web page 10. First, there is no title area 14. In addition, there are no boxes provided for each of the areas 120. In each of the areas 120 there is contained a "READ MORE!" contained within box 122 rather than "GO THERE" as in box 22. Further, the graphic images in the areas 120 operate as hyperlinks to a third party site when activated by the user. Further, in this embodiment at least one and preferably each of the graphic images are obtained from the third party site to which it is hyperlinked, similar to the images 18. There is also no link navigation icon in the navigation area 124 as compared to the navigation area 24. Finally, the locus page 110 includes a focus area 140 generally rectangular in this embodiment, although other configurations can be provided, and which is positioned closer to the right side of the web page 110 than the left and also preferably positioned integrated within the area 116 underneath the title box 112. The focus area 140 preferably includes text and/or graphics and comprises a list of focus topics available under the locus page 110. For example, in this embodiment, there are six focus topics identified. The focus page 10 is illustrated in the list by the "Early Ventures Fail" topic. The remaining focus topics correspond to other web pages available on the web site. In addition, preferably there is a link provided for each focus topic area, which is provided by a box 142 in this embodiment in which is contained a "go" designation.

Figure 3:
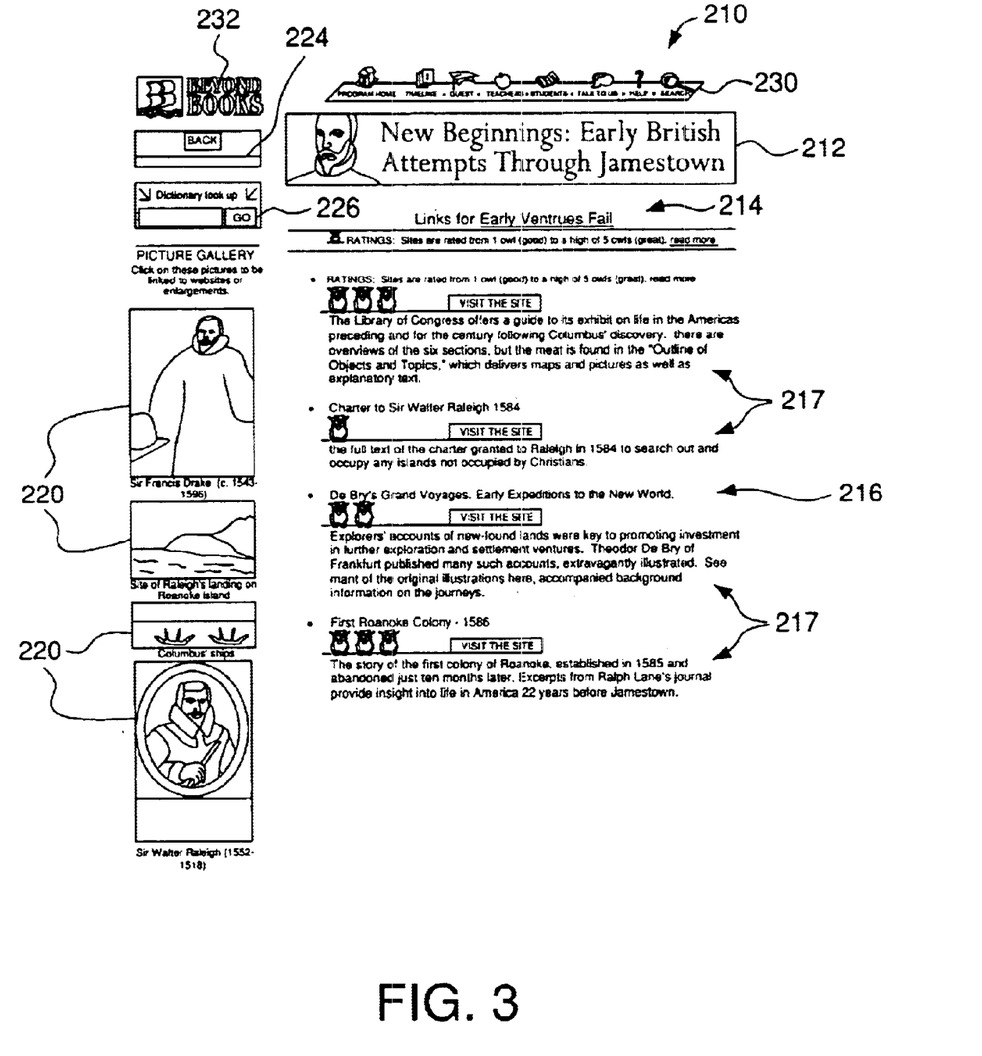
FIG. 3 is a graphical user interface in accordance with a third embodiment of the present invention.

Another embodiment of a graphical user interface is illustrated in FIG. 3 by the web page 210, which applicant has termed "links page". Similar to the web page 110, for simplicity only those portions which differ from the web page 10 will be described in detail herein. The web page 210 includes the additional text description which reads "links 4" in the title area 214. In the areas 220 is a combination of graphic images and text similar to the areas 120. The images in the area 220 similarly operate to allow access to a third party site or enlargements of the image and further preferably are obtained from the third party site. In the web page 210 this area is called the "picture gallery". Further, the web page 210 in the area 216 includes a list of links 217. Each link 217 includes text, preferably original text, describing a particular third party web site. In this embodiment, the text preferably is similarly in a form to tease the user to seek out more information. In addition, preferably each link 217 includes a box containing the text "visit this site" which the user activates to access the third party site. In addition, in the present embodiment preferably each link is rated, which is ranked in the present embodiment on a scale from 1 (good) to a high of 5 (great). In the present embodiment, the rating symbol used is an owl and each link has preferably been rated by the site provider, however, any other symbol or other methods of rating can be used where desired for the same purpose. In addition, the navigation box 224 only includes a back navigation button. Finally, no drop down box 28 is provided. The links web page 210 in this embodiment can be accessed by the link navigation button 24 on the focus page 10.

Figure 4:
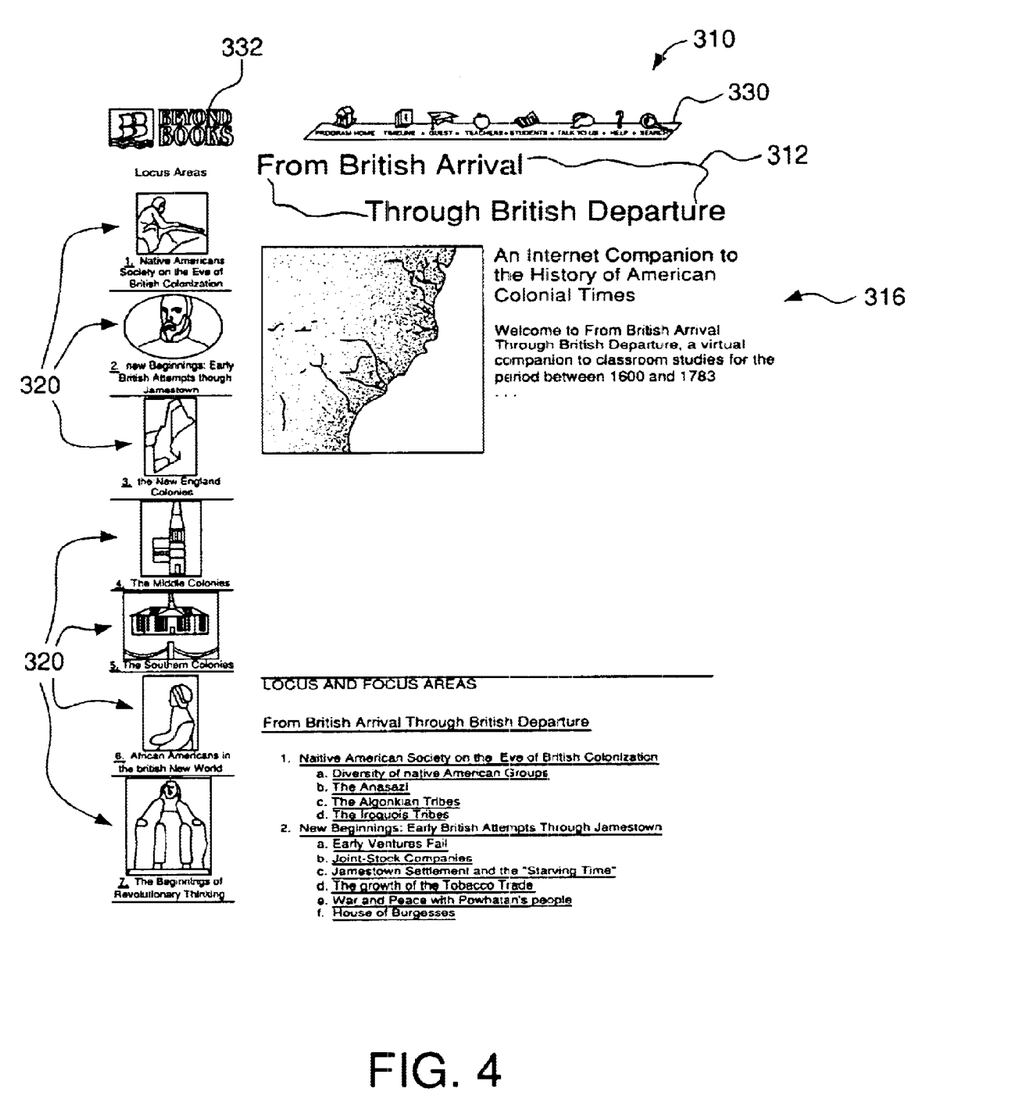
FIG. 4 is a graphical user interface in accordance with a fourth embodiment of the present invention.

Another embodiment of a graphical user interface in accordance with the present invention is illustrated in FIG. 4 by the web page 310. The web page 310 is termed by applicant as the "main program page". Similarly, only the portions which differ from the earlier embodiments will be described. In the main program page 310, the areas 320 includes graphic images and text, similar to the areas 220. Each of the separate entries within the areas 320 in this embodiment correspond to a separate locus page available under the program page 310. For example, the locus page entry identified by number "2" provides a link to the web page 110. Further, in area 316 is included an outline of all the locus and focus web pages available for the particular main program page. Preferably, in this embodiment, each numbered locus page and lettered focus page provides a link for the user to the respective locus/focus web pages. Finally, the web page 310 in this embodiment does not include a dictionary look up area 26, a navigation area 24, a drop down area 28 or a title area 14.

Figure 5:
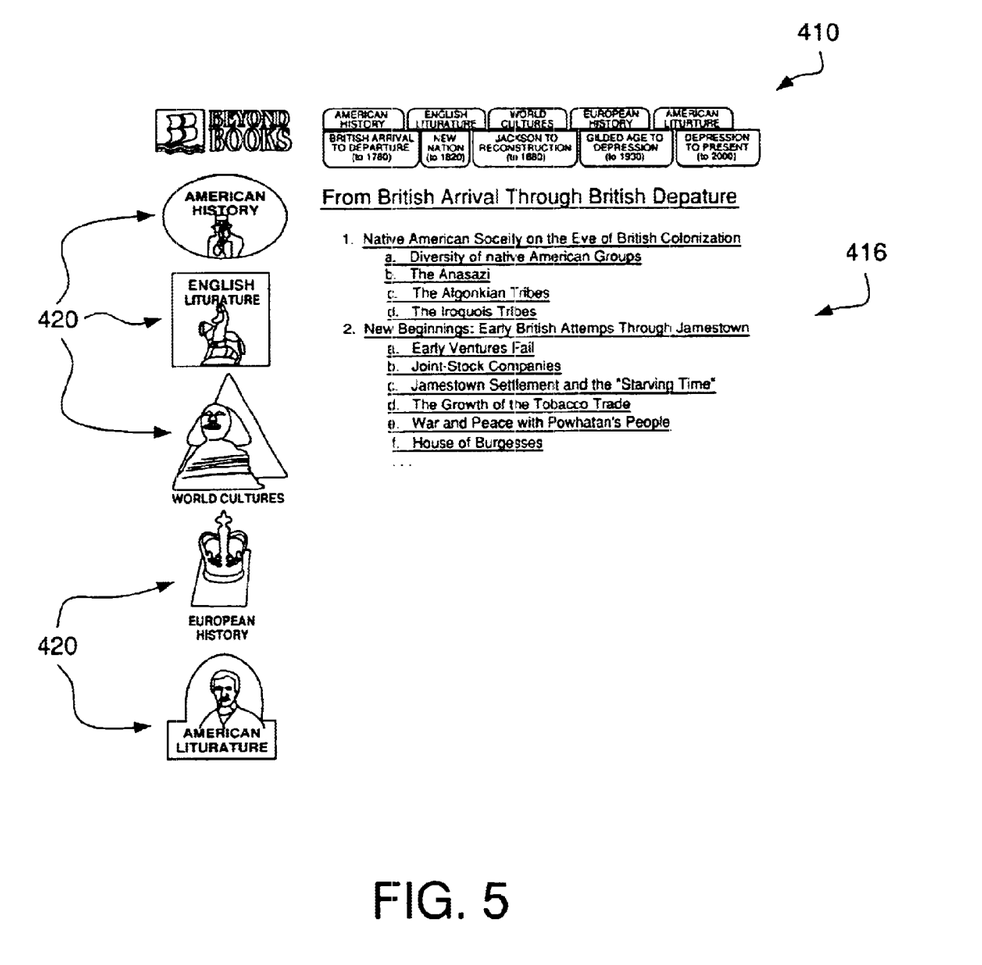
FIG. 5 is a graphical user interface in accordance with a fifth embodiment of the present invention.

Another embodiment of a graphical user interface in accordance with the present invention is illustrated by web page 410 in FIG. 5. Similar to the web page 310, the web page 410 includes an outline of locus and focus pages in the area 416. The web page 410 also includes a list of subject areas in the area 420 along the left side, which are each preferably provided in the form of an icon, and a similar subject list provided along the upper portion of the web page 410, which preferably is a textual description. The locus and focus page outline on the web page 410 similarly operates as links as are provided with the web page 310.

Figure 6:
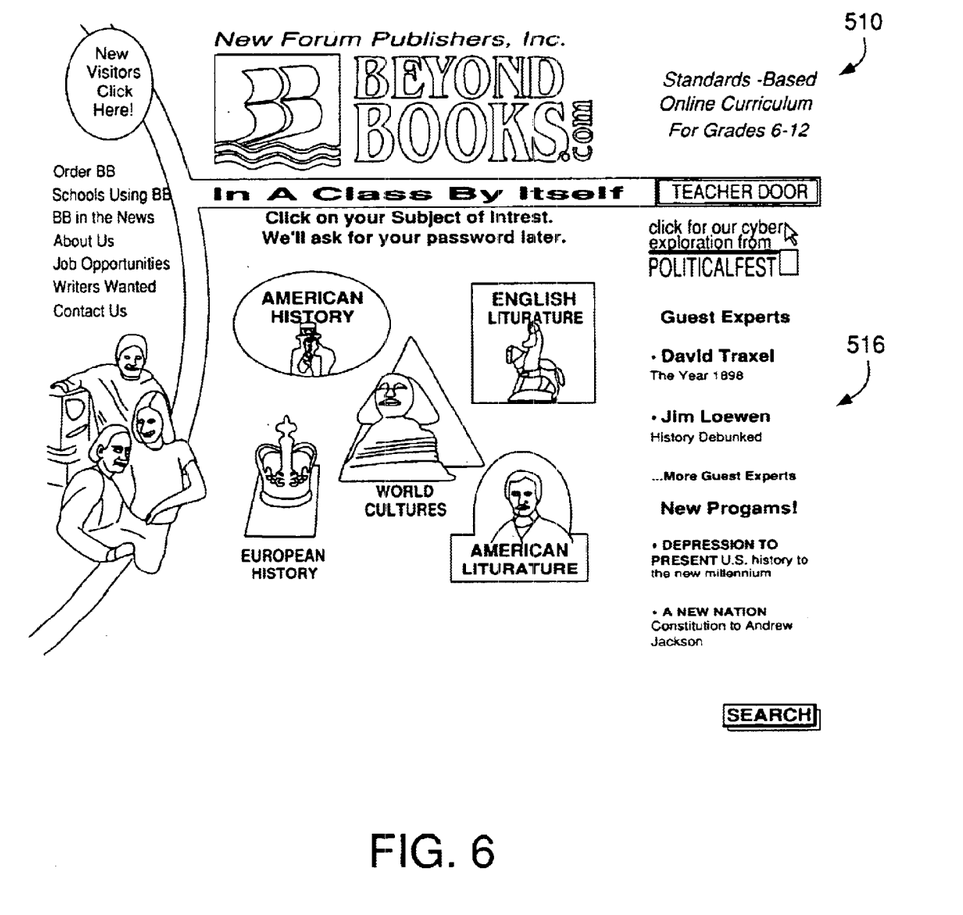
FIG. 6 is a graphical user interface in accordance with a sixth embodiment of the present invention.

Another embodiment of a graphical user interface in accordance with the present invention is illustrated by web page 510 shown in FIG. 6. The web page 510 in this embodiment includes a list of subject areas which each operate as links to other web pages in the site, which are provided in this embodiment in the area 516.

Figure 7:
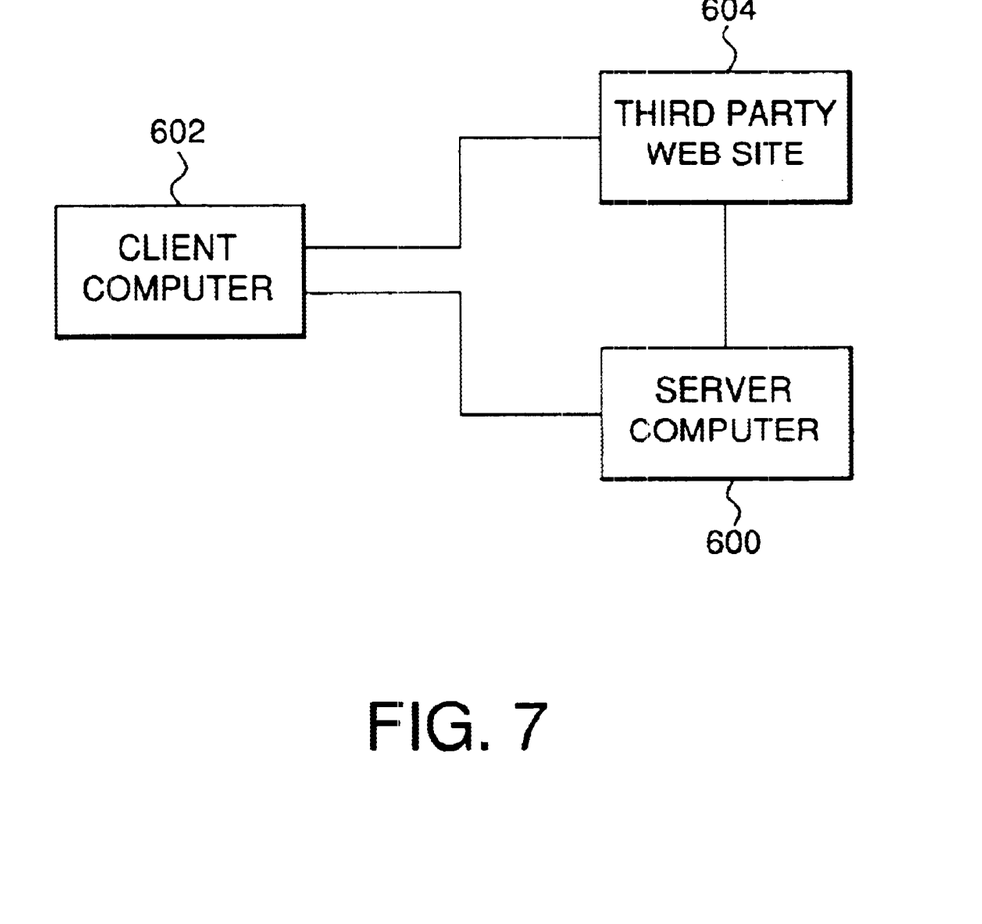
FIG. 7 is a functional block diagram illustrating an embodiment of a network interface on which a graphical user interface in accordance with the various embodiments of the present invention are displayed to a user.

In FIG. 7 is illustrated a functional block diagram of one embodiment of a network in accordance with the present invention. As indicated earlier, in a preferred embodiment of the present invention the various graphical user interfaces are displayed on a computer or other processing device connected to a network, such as the Internet. An example of an Internet connection is illustrated in FIG. 7. In this embodiment, preferably at least one remote processing device comprising a server computer 600 is in communication with at least one local processing device comprising a client computer 602. In a presently preferred embodiment, the network will allow multiple client computers 602 to communicate with server computer 600 at the same time. In addition, multiple server computers 600 can be utilized in the network where desired rather than a single device. The client computers 602 and server computers 600 can communicate over any desired medium, such as any wired or wireless medium or combination of the two. Each server computer 600/client computer 602 in this embodiment preferably can be any suitable type of processing device. In this manner, the web pages saved on the server computer 600 are available for access by the client computer 602 and then displayed on a terminal or other suitable display in the manner discussed above. It should be understood, however, that the present invention can be utilized with other networks as well, such as internally on a local area or wide area network, over any publicly accessible system, over any private system or on a stand alone system, as examples.

An advantage of an Internet connection is that information from one or more third party web sites, such as illustrated at 604 in FIG. 7, are available by hyperlink or similar means, so that the respective data is not required to be stored on site at the server computer 600. In this manner, only limited information is required to be stored on the server computer 600, which in the illustrated embodiments comprises the content of the web pages shown in FIGS. 1–6 and with the remaining information obtained from the third party sites.

Another advantage of the various embodiments is that a variety of different educational material can be easily provided, since each separate topic would follow the same format of web pages discussed above. Also, since a constant format is maintained, changes or updates can be easily accomplished.

Another advantage of the various embodiments discussed above is that the system can be utilized for educational material geared toward children of different ages and at different levels, or alternatively to adults where desired. In particular, a common underlying advantage is that the present invention provides various web page layouts that facilitate the learning process. For example, the organizational layout is easy to follow and very orderly. In addition, a combination of text and graphical images makes it easy to identify a given subject. Further, the form of text provides interesting anecdotes to users of any age, which facilitates further learning since it inspires or "teases" the user to look for more information, which is then available by hyperlink to a third party site. Also, an advantage is that a hierarchal organization of other related web pages for each category are available on the same web site and which are systematic and remain constant for each subject.

It is understood, therefore, that the present invention is susceptible to many different variations and combinations and is not limited to the specific embodiments shown in this application. In addition, it should be understood that each of the elements in the foregoing embodiments are not all required in any one embodiment. Further, the features in some of the embodiments may be combined with features of other embodiments where desired. It will also be appreciated that a system in accordance with the invention can be constructed in whole or in part from special purpose hardware or from conventional general purpose computer hardware or any combination thereof, any portion of which may be controlled by a suitable program. Any program may in whole or in part comprise part of or be stored on a system in a conventional manner, or remain whole or in part be provided into the system over a network or other mechanism for transferring information in a conventional manner. Accordingly, it is understood that the above description of the present invention is susceptible to considerable modifications, changes and adaptation by those skilled in the art, and that such modifications, changes and adaptations are intended to be considered within the scope of the present invention, which is set forth by the appended claims.

What is claimed is:

1. A system for communicating educational information over a computer network comprising:
   at least one remote processing device;
   at least one local processing device in communication with the at least one remote processing device;
   a web site available at the at least one remote processing device for display at the at least one local processing device;
   wherein said web site comprises a first web page having embedded therein:
      original information on a given educational topic stored at the remote processing device for display at the local processing device;
      at least one sub-region having a hypertext link corresponding to the given educational topic, wherein when the at least one sub-region is activated, said web page is linked to a third party site and said third party site is displayed on said local processing device; and
      customized information corresponding to said hypertext link stored at the remote processing device for display at the local processing device on said web page proximate said at least one sub-region; and
   a navigation sub-region having one or more links to other web pages within the web site including a link to a second web page having embedded therein one or more sub-regions each having a hypertext link to a third party site, customized information corresponding to the third party site and a ranking of the third party site on a rated scale for display at the local processing device.

2. A system according claim 1, wherein said original information comprises at least one of text and graphical images.

3. A system according to claim 2, wherein said customized information comprises text in a form designed to encourage curiosity and visitation of said third party site.

4. A system according to claim 1, wherein the second web page further comprises a graphical image corresponding to the one or more hypertext links and textual information proximate each said graphical image.

5. A system according to claim 4, wherein said first web page further comprises a dictionary look-up region having embedded therein a region for inputting a term and a hypertext link to a third party dictionary site to provide a dictionary definition of said term.

6. A system according to claim 5, wherein said second web page further comprises a dictionary look-up region having a hyper text link to a third party dictionary site and a link to the first web page.

7. A system according to claim 6, further including a third web page for display at said local processing device having embedded therein original information on said given educational topic locally stored at the remote processing device, at least one sub-region having a hypertext link to a third party site corresponding to said given educational topic, customized information corresponding to said hypertext link displayed on said web page proximate said at least one sub-region and a link to said first web page.

8. A system according to claim 7, wherein said original information comprises at least one of text and graphical images, said customized information comprises text in a form designed to encourage curiosity and visitation as to the third party site and a dictionary look-up region having a hypertext link to a third party dictionary site for display at the local processing device.

9. A system according to claim 8, further including a fourth web page having embedded therein a textual summary of said first and third web pages in outline format, graphical images from said first web page and original information in a form of at least one of text and graphical images for display at said local processing device.

10. A system according to claim 9, further comprising a fifth web page comprising a textual summary of said first and third web pages in outline format and a textual description of a plurality of educational topics.

11. A graphical user interface for a computer display comprising:
   a first web page capable of being displayed on the computer display, said first web page having embedded therein:
      original information on a given educational topic;
      at least one sub-region having a hypertext link corresponding to the given educational topic, wherein when the at least one sub-region is activated, the web page is linked to a third party site and the third party site is displayed on said computer display;
      customized information corresponding to said hypertext link located on said web page proximate said at least one sub-region;
   a second web page capable of being displayed on the computer display having embedded therein:
      original information on a given educational topic;
      at least one sub-region having a hypertext link corresponding to the given educational topic, wherein when the at least one sub-region is activated, the web page is linked to a third party site and the third party site is displayed on the computer display; and
      customized information corresponding to said hypertext link located on the web page proximate the at least one sub-region;
   the second web page further including a link to the first web page; and
   a third web page capable of being displayed on the computer display having embedded therein:
      one or more sub-regions each having a hypertext link to a third party site corresponding to the given educational topic, wherein when the at least said one or more sub-regions are activated, the third web page is linked to a third party site and the third party site is displayed on said computer display;
      customized information corresponding to the third party site on the third web page proximate the one or more sub-regions; and
      a ranking of said third party site on a rated scale positioned on the third web page proximate said customized information;
   wherein the first web page further includes a link to the third web page.

12. A graphical user interface according to claim 11, wherein the first, second and third web pages each further comprises a dictionary look-up region having embedded therein a region for inputting a term and a hypertext link to a third party dictionary site to provide a dictionary definition of said term, the original information comprises at least one of text and graphical images, and the customized information comprises text in a form designed to encourage curiosity and visitation of the third party site.

13. A method for communicating educational information over a network from a web site to aplurality of users comprising:
   at least first and second web pages, each of the first and second web pages having embedded therein:
      original information on a given educational topic locally stored at the web site;
      at least one sub-region having a hypertext link corresponding to the given educational topic, wherein when the at least one sub-region is activated, said first and second web pages are linked to a third party site and the third party site is displayed to a user;
      customized information corresponding to the hypertext link locally stored at the web site positioned on the web page proximate the at least one sub-region;
      a dictionary look-up region having embedded therein a region for inputting a term and a hypertext link to a third party dictionary site to provide a dictionary definition of the term;
   wherein the second web page further comprises a link to said first web page; and
   a third web page having embedded therein;
      one or more sub-regions each having a hypertext link to a third party site;
      customized information corresponding to the third party site;
      a ranking of the third party site on a rated scale; and
      a dictionary look-up region having embedded therein a region for inputting a term a hypertext link to a third party dictionary site to provide a dictionary definition of the term.

14. A method according to claim 13, wherein the original information comprises at least one of text and graphical images, the customized information comprises text in a form designed to encourage curiosity and visitation to the third party site and the first, second and third web pages each further comprising a navigation sub-region having one or more links to other web pages within said web site.

* * * * *